United States Patent [19]

Sur et al.

[11] 4,178,977

[45] Dec. 18, 1979

[54] LAWNMOWER COVER

[76] Inventors: Ferdinand Sur, George Spector, both of 3615 Woolworth Bldg., 233 Broadway, New York, N.Y. 10007

[21] Appl. No.: 905,473

[22] Filed: May 12, 1978

[51] Int. Cl.² ............................................. B65D 85/68
[52] U.S. Cl. .................................. 150/52 R; 52/3; 135/1 A
[58] Field of Search ............... 150/52 R, 52 K; 52/3; 135/1 A; 56/320.1; 206/335

[56] References Cited

U.S. PATENT DOCUMENTS

| 3,031,910 | 5/1962 | Lofaro | 150/52 R UX |
| 3,087,585 | 4/1963 | Knuth | 150/52 R X |
| 3,279,515 | 10/1966 | Kesh | 150/52 R |

*Primary Examiner*—Donald F. Norton

[57] ABSTRACT

A molded plastic cover for a lawnmower, the cover consisting of two interslidable halves or shells in order to fit different sizes of lawnmowers, each opposite end of the cover having an underside inward lip for sliding under the lawnmower edges so to prevent a wind to blow the cover off.

2 Claims, 4 Drawing Figures

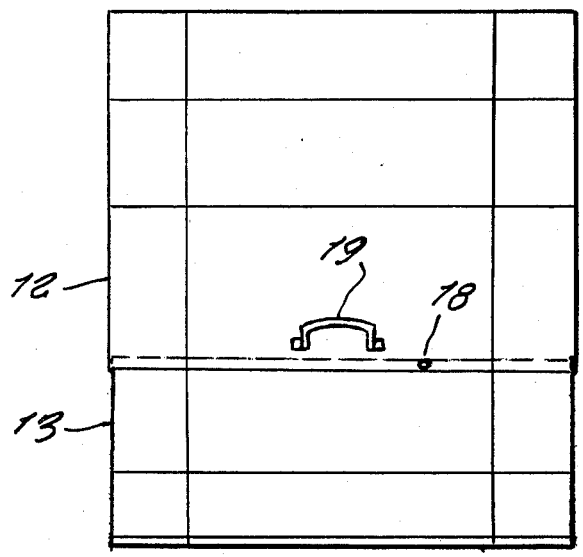
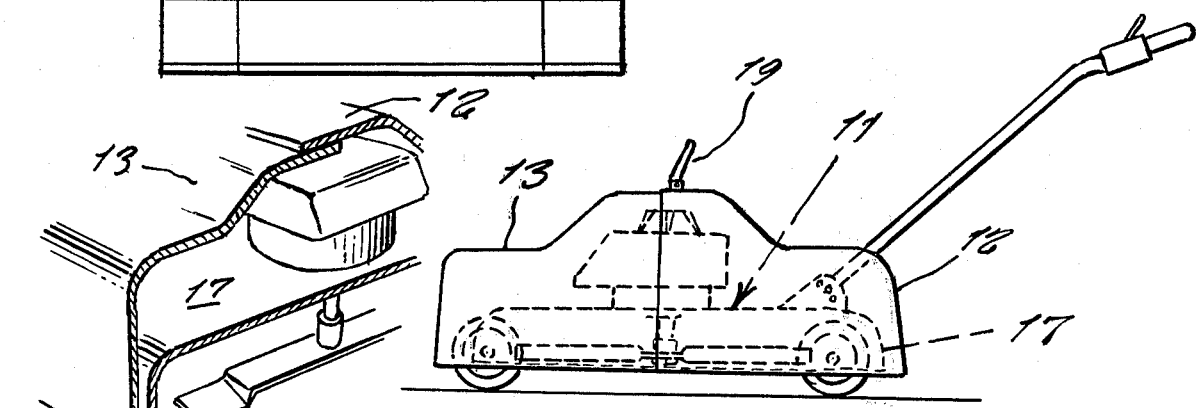
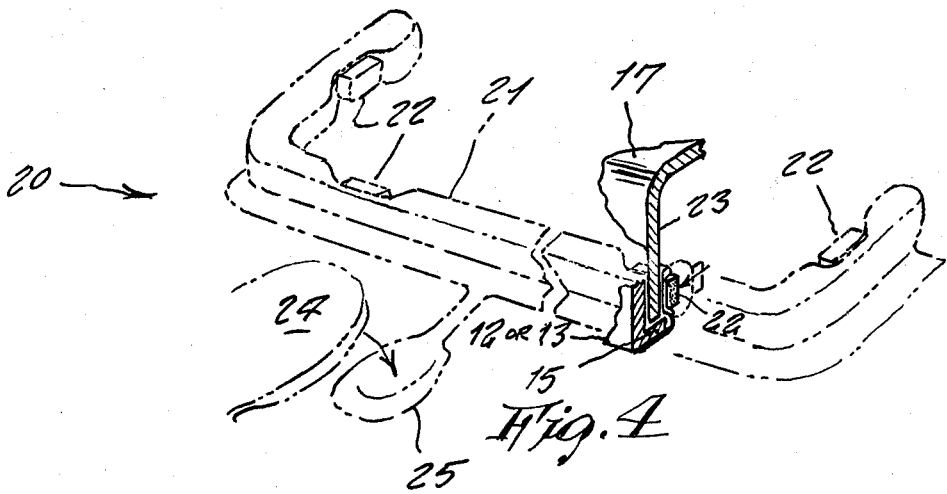

LAWNMOWER COVER

This invention relates generally to lawnmower accessories.

A principal object of the present invention is to provide a cover for a lawnmower in order to protect it from a weather such as rain when being stored out-of-doors or in a damp area.

Another object is to provide a molded plastic lawnmower cover which is adjustable in size so to fit different dimensional mowers.

Yet another object is to provide a lawnmower cover which includes means to anchor itself to the mower so to prevent the cover to be blown away in a high wind.

Other objects are to provide a lawnmower cover which is simple in design, inexpensive to manufacture, rugged in construction, easy to use and efficient in operation.

These and other objects will be readily evident upon a study of the following specifications and the accompanying drawing wherein:

FIG. 1 is a top plan view of the Sure Lawnmower Covering

FIG. 2 is a side view thereof shown installed around a lawnmower.

FIG. 3 is a fragmentary perspective showing in cross section how a 20 by 2 inch section fits under the mower edge so to prevent the covering from blowing off in a high wind.

FIG. 4 is a similar view of a modified design thereof wherein permanent magnets are additionally used to held the covering to the lower edge of the mower; the magnets being selectively activated by being mounted on an inflated tube so to make placing or removing the cover a very easy task.

Refering now to the drawing in greater detail, and more particularly to FIGS. 1 to 3 thereof at this time, the reference numeral 10 represents a cover according to the present invention for placement over a lawnmower 11. The cover is comprised of two molded plastic shells 12 and 13 that interslide together in order that the cover can be adjusted to fit different sizes of lawnmowers.

Opposite lower edges 14 of the cover includes an inwardly projecting lip 15, one of which is on each of the shells; the lips serving to extend underneath a lower edge 16 of the lawnmower housing 17 in order to anchor thereunder and prevent a high wind to blow the cover off the mower.

A set screw 18 can serve to secure the shells together in a selected relation so to prevent the shells to accidently spread apart thereby retaining the lips under the mower housing. An opening or a slot from a lower edge of the cover may be provided so the cover clears the lawnmower handle.

A handle 19 is provided for easy lifting or lowering the cover on the mower.

In FIG. 4, another design of lawnmower cover 20 includes additional magnets means for securement of the cover to the mower. This consists of an inflatable rubber tube 21 being attached to an underside of the lip 15, the tube having a plurality of spaced apart permanent magnets 22 secured to a side thereof so that when the tube is deflated, the magnets are positioned so to hold against an inner side 23 of the mower housing 17 for magnetic securement thereto. As clearly shown in FIG. 4, the magnets are secured on a side of the tube which is away from the housing surface so that when the tube is in a deflated position, the magnetic force of the magnet must pass through both side walls of the tube in order to grasp against the housing.

When it is desired to remove the cover, the magnets can be easily made to loose their grasp of the housing all at one time in an easy manner by simply stepping with a foot 24 upon a hollow foot pedal 25 that comprises an exterior sidewardly of the rubber tube. This causes air inside the pedal to move inside the tube in order to inflate the same and thus separate the opposite side walls of the tube from each other. Thus the tube side wall, carrying the magnets, is moved away from the mower housing, and causes the magnets to be too far from the housing in order to have an attractive force for holding thereagainst. So the cover is magnetically disengaged from the mower for easy removal. It is understood that the rubber tube may be manufactured so that in a freely relaxed position it is deflated flat.

While various changes may be made in the detail construction, it is understood that such changes will be within the spirit and scope of the present invention as in defined by the appended Claims.

What is claimed is:

1. A lawnmower cover, comprising in combination, two molded plastic shells that interslide together adjustably to fit over different sized mowers, a pair of inward extending lips on opposite lower edges of said cover, one said lip being on each said shell, for anchoring under edges of a housing of said mower.

2. The combination as set forth in claim 1, wherein an inflatable rubber tube is secured on an underside of each said lip, each tube in a relaxed, deflated position adapted to extend adjacent an inner side of said mower housing, and said tube having a plurality of spaced apart permanent magnets secured to a side thereof which is remote from said lip and which is adapted to be spaced from said mower housing inner side, and said tube being integral with a sidewardly extending hollow flexible rubber pedal which in a relaxed position is inflated with air.

* * * * *